(12) United States Patent
Cheng et al.

(10) Patent No.: US 7,071,263 B2
(45) Date of Patent: Jul. 4, 2006

(54) EPOXY ADHESIVES AND BONDED SUBSTRATES

(75) Inventors: Ming Cheng, Woodbury, MN (US); Ying-Yuh Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 210 days.

(21) Appl. No.: 10/440,591

(22) Filed: May 19, 2003

(65) Prior Publication Data

US 2004/0234774 A1 Nov. 25, 2004

(51) Int. Cl.
*C08L 9/02* (2006.01)
*C08L 63/00* (2006.01)
*C08L 63/02* (2006.01)

(52) U.S. Cl. .................. 525/113; 525/187; 525/329.1; 525/329.5; 525/332.7; 525/454

(58) Field of Classification Search ................. 525/113
See application file for complete search history.

(56) References Cited

U.S. PATENT DOCUMENTS

| | | | | |
|---|---|---|---|---|
| 4,169,196 A | | 9/1979 | Ehrlich et al. | 528/58 |
| 4,521,490 A | | 6/1985 | Pocius et al. | 428/416 |
| 4,538,920 A | | 9/1985 | Drake | 366/177 |
| 4,668,736 A | | 5/1987 | Robins et al. | 525/65 |
| 5,001,193 A | * | 3/1991 | Golden | 525/109 |
| 5,082,147 A | | 1/1992 | Jacobs | 222/137 |
| 5,420,202 A | | 5/1995 | St. Clair et al. | 525/92 H |
| 5,548,026 A | | 8/1996 | Jorissen et al. | 525/113 |
| 5,629,380 A | * | 5/1997 | Baldwin et al. | 525/113 |
| 5,807,910 A | | 9/1998 | Tseng et al. | 523/428 |
| 6,645,341 B1 | * | 11/2003 | Gordon | 156/330 |
| 6,776,869 B1 | * | 8/2004 | Schenkel | 156/331.7 |
| 6,800,157 B1 | * | 10/2004 | Tarbutton et al. | 156/73.5 |
| 2003/0159773 A1 | * | 8/2003 | Tomiyama et al. | 156/248 |
| 2003/0187154 A1 | * | 10/2003 | Schoenfeld et al. | 525/523 |

FOREIGN PATENT DOCUMENTS

| | | |
|---|---|---|
| DE | 40 01 417 A1 | 7/1991 |
| DE | 100 17 783 A1 | 10/2001 |
| EP | 0 169 066 | 1/1986 |
| EP | 0 145 323 | 5/1988 |
| JP | 09-208921 A | 8/1997 |
| JP | 11-209727 A | 8/1999 |
| JP | 2001-288336 A | 10/2001 |
| JP | 2001-288366 A | 10/2001 |
| JP | 2002-080812 A | 3/2002 |
| JP | 2002-118143 A | 4/2002 |
| WO | WO 9512647 A1 * | 5/1995 |
| WO | WO 95/18183 | 7/1995 |
| WO | WO 02/02024 | 1/2002 |

OTHER PUBLICATIONS

Kirk-Othermer, "Encyclopedia of Chemical Technology", vol. 21, 2nd Ed., Interscience Publishers, NY, p. 94 et seq., 1970.

* cited by examiner

*Primary Examiner*—Robert Sellers
(74) *Attorney, Agent, or Firm*—Lisa P. Fulton

(57) ABSTRACT

Epoxy adhesives are reported that comprise: (i) about 20% to about 40% weight of a reactive oligomer having a glass transition temperature of about −40° C. or less after curing and having at least two functional groups selected from epoxide, isocyanate, and amine; (ii) an amine curative; and (iii) an epoxide-group containing compound. The epoxy adhesives are resistant to thermal shock and have a low shear creep. The epoxy adhesives are particularly suitable for bonding substrates having mismatched coefficients of thermal expansion.

15 Claims, No Drawings

EPOXY ADHESIVES AND BONDED SUBSTRATES

BACKGROUND

Epoxy adhesives are widely used to form permanent bonds between substrates. High modulus epoxy adhesives are often used when it is desired to form a bond having high overlap shear strength and high T-peel strength.

When substrates having unequal or mismatched coefficients of thermal expansion are adhesively bonded to one another, the unequal thermal expansion rates of the substrates may cause stress to build up in the adhesive and/or in the substrate. For example, when adhesively bonded substrates are exposed to changing temperature, the stress built up in the adhesive and/or the substrate may cause the adhesive bond to prematurely fail.

One approach to bonding substrates having unequal coefficients of thermal expansion is to utilize highly flexible adhesives, for example, epoxy adhesives cured with long chain amines. These types of adhesives have a polymeric structure that allows the adhesive to relieve stress that may be imparted by movement of one or more of the substrates. Although these adhesives may be suitable for some bonding applications, they are typically quite soft and have a large shear creep under load. That is, the adhesive may allow the bonded substrates to move relative to one another when subjected to shear load.

Certain demanding bonding applications require adhesives that can both bond substrates having unequal or mismatched coefficients of thermal expansion, and that have a low shear creep under load. For example, certain optical devices require the bonding of glass to plastic in such a manner that the bond can withstand repeated cycling of the bonded substrates from low temperature (e.g., $-40°$ C.) to high temperature (e.g., $60°$ C.) with no spalling of the glass substrate. In addition, the adhesive must have a shear creep under load of about 10 microns or less in order to prevent unacceptable loss of alignment of the optical components in the device.

In view of the foregoing, what is desired is an adhesive that can bond substrates having unequal or mismatched substrates and which has a low shear creep under load.

SUMMARY

The present invention provides epoxy adhesives that are suitable for bonding CTE mismatched substrates. As used herein, the term "CTE mismatched substrates" refer to substrates that, relative to one another, have unequal thermal expansion coefficients. That is, substrate 1 has thermal expansion coefficient ($\alpha_1$) and substrate 2 has thermal expansion coefficient ($\alpha_2$) where $\alpha_1 \neq \alpha_2$. Representative examples of CTE mismatched substrates include glass/plastic and glass/metal. In certain embodiments, the CTE mismatched substrates have coefficients of thermal expansion that differ by 4 ppm/° C. or greater.

Epoxy adhesives of the present invention comprise: (a) about 20% to about 40% weight percent of an oligomer having a glass transition temperature (Tg) of about $-40°$ C. or less after curing and having at least two functional groups selected from epoxide, isocyanate, and amine; (b) an amine curative; and (c) an epoxide-group containing compound.

Epoxy adhesives of the present invention are resistant to stress-induced failure of the adhesive bond that may result when adhesively-bonded CTE mismatched substrates are subjected to a change in temperature. When used to bond CTE mismatched substrates, epoxy adhesives of the present invention are capable of dissipating stress imparted to the adhesive bond as a result of a mismatch in thermal expansion coefficient of the bonded substrates. In certain embodiments, the epoxy adhesives are capable of passing a Thermal Shock Test Procedure as described herein.

Epoxy adhesives of the present invention are resistant to shear creep under load, that is, shear movement of one bonded substrate relative to the other under an applied load. For example, the epoxy adhesives of the present invention have a shear creep under load of about 10 microns or less when tested in accordance with the Shear Creep Test Procedure described herein. In certain other embodiment, the epoxy adhesives have a shear creep of about 5 microns or less when tested in accordance with the Shear Creep Test Procedure described herein.

In another aspect the invention provides a bonded assembly comprising:
 a first substrate having a coefficient of thermal expansion;
 a second substrate having a coefficient of thermal expansion that is not equal to the coefficient of thermal expansion of the first substrate; and
 a cured epoxy adhesive that adhesively-bonds the first substrate to the second substrate, the epoxy adhesive comprising in an uncured state:
  about 20% to about 40% weight of an oligomer having a glass transition temperature of about $-40°$ C. or less and having at least two functional groups selected from epoxide, isocyanate, and amine;
  an amine curative; and
  an epoxide-group containing compound.

The cured epoxy adhesive of the bonded assembly passes the Thermal Shock Test and has a shear creep under load of about 10 microns or less when tested in accordance with the Shear Creep Test Procedure. Representative substrates include glass, plastic and metal.

DETAILED DESCRIPTION

The present invention provides epoxy adhesives comprising (a) about 20% to about 40% weight percent of an oligomer having a glass transition temperature (Tg) of less than about $-40°$ C. after curing and having at least two functional groups selected from epoxide, isocyanate, and amine; (b) an amine curative; and (c) an epoxide-group containing compound.

Oligomer:

Epoxy adhesives of the present invention comprise a reactive oligomer having a glass transition temperature (Tg) that is less than about $-40°$ C. as measured by DSC. Generally, low Tg reactive oligomers may be represented by formula (I):

$$[X]_n\text{—R} \qquad (I)$$

where:
 X is a reactive functional group independently selected from epoxide

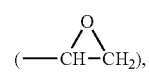

isocyanate (—N=C=O), and amine (—NH$_2$);
 n is at least 2; and
 —R is n-valent oligomer.

For example, in some embodiments, the oligomers have two reactive functional groups and may be represented by formula (II):

$$X_1—R—X_2 \qquad (II)$$

where:
X$_1$ and X$_2$ are reactive functional groups independently selected from epoxide

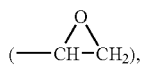

isocyanate (—N═C═O), and amine (—NH$_2$); and
—R— is a divalent oligomer.

Amine terminated reactive oligomers may be prepared by free radical polymerization or copolymerization of ethylenically-unsaturated monomers. Represenative examples of ethylenically-unsaturated monomers include olefin, acrylics, styrene, butadiene, acrylonitrile, etc. The type and/or amount of the ethylenically unsaturated monomer is selected in order to provide a polymer or copolymer having the desired Tg below about −40° C.

Representative examples of low Tg reactive oligomers include amine-terminated butadiene/acrylonitrile polymers, for example, the amine-terminated butadiene/acrylonitrile polymer commercially available under the trade designation "ATBN X-16" from Noveon Specialty Chemicals (Cleveland Ohio).

Isocyanate-terminated reactive oligomers may be prepared by reaction of diisocyanates with diols, diamines, and/or alkanolamines to give polyurethane, polyureas, or polyurethaneureas that have a glass transition temperature, Tg, below about −40° C. The compounds and process for preparing elastomeric polyurethane are well known (see, for example, Kirk-Othmer, "Encyclopedia of Chemical Technology", Vol. 21, second edition, Interscience Publishers, NY, page 94 et seq., 1970). Examples of preferred diisocyanates are aliphatic and alicyclic diisocyanates such as methylene bis(4-cyclohexyl isocyanate), hexamethylene diisocyanate and isophorone diisocyanate. Other diisocyanates are the preferred aromatic diisocyanates such as 2,4-tolylene diisocyanate, 4,4'-methylenebis(phenylenediisocyanate) and 1,5-naphthalene diisocyanate.

Examples of diols that can be reacted with the diisocyanates are the polymeric diols and diol extenders that are conventionally employed in the art for the preparation of urethane elastomers. The polymeric diols are polyester diols, poly(oxyalkylene)diols in which the alkylene group has 2 to 4 carbon atoms, polyolefin diols, and polydiene diols having a molecular weight from about 400 to 4000. Such diols are well known in the art. Examples of the polyester diols (prepared from dicarboxylic acids having 4 to 18 carbon atoms and polyhydric alcohols having 2 to 18 carbon atoms) are poly(ethylene suberate)diol, poly(hexamethylene adipate)diol, and poly(caprolactone)diol. Examples of polyether diols (polymers containing aliphatic or cycloaliphatic groups, interrupted by O atoms) are poly(oxyethylene)diol, poly(oxypropylene)diol and poly(oxybutylene)diol. For other examples of polyester and polyether diols and how they are prepared see, for example, U.S. Pat. No. 4,169,196.

Epoxy-terminated reactive oligomers may be epoxidized polydiene polymers, for example, epoxidized polyisoprene or epoxidized polybutadiene homopolymers. Typically, the epoxy-terminated reactive oligomers have a molecular weight that ranges from about 500 to about 20,000.

If the amount of low Tg reactive oligomer is too low the resulting adhesive may not dissipate stress sufficiently to pass the Thermal Shock Test. If the amount of low Tg reactive oligomer is too high, the resulting adhesive may have an unacceptably high shear creep. The low Tg reactive oligomer is typically present in epoxy adhesives of the present invention in an amount ranging from about 20% to about 40% weight. In some embodiments, the low Tg reactive oligomer may be present in an amount ranging from about 30% to 40% weight.

Amine Curative:

Adhesive compositions of the present invention comprise an amine curative. The amine curative may be difunctional (i.e., two amine groups per molecule), trifunctional (i.e., three amine groups per molecule), tetrafunctional, or may have a higher functionality. Mixtures of amine compounds having varying functionalities may be described as having non-integer functionalities. For example, a mixture of difunctional and trifunctional amine curatives may have a non-integer functionality ranging from greater than 2 to less than 3.

In certain embodiments the amine curative is a poly(oxyhydrocarbolene)diamine having the formula:

$$H_2N—RO(R^1O)_nRNH_2$$

where: R is a linear or branched chain alkylene group having 2 to 4 carbon atoms;
R$^1$ is an hydrocarbolene group having 2 to 8 carbon atoms selected from straight and branched chain alkylene groups having 2 to 4 carbon atoms, cycloalkylene groups having 4 to 8 carbons, and arene groups having 6 to carbon atoms, and n is a number having a value of 1 to 10 such that the number average molecular weight of said curing agent is from 17 to 750; with the proviso that when R$^1$ is a branched chain alkylene the value of n is at least 5.

In certain embodiments, the poly(oxyhydrocarbolene)diamine curing agent has the formula:

$$H_2N—CH_2CH_2CH_2O—W—CH_2CH_2CH_2—NH_2$$

where W is a divalent linking group selected from:

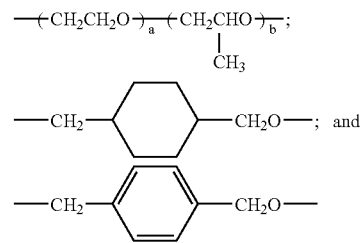

where a is 1 to 5 and b is 4 to 10.

In certain other embodiments, the poly(oxyhydrocarbolene)diamine curing agent has the formula:

$$H_2N—CH_2CH_2O(CH_2CH_2O)_cCH_2CH_2—NH_2$$

where c is 4 to 10.

In certain other embodiments, the poly(oxyhydrocarbolene)diamine curing agent has the formula:

$$H_2N—CH_2CH_2CH_2O(CH_2CH_2O)_aCH_2CH_2CH_2—NH_2$$

where a is 1 to 5.

A representative example of a diamine curing agent is 4,7,10-trioxa-1,13-tridecanediamine which is commercially available from Aldrich Chemical Company, (Milwaukee, Wis.).

Epoxide Group-Containing Compound:

Adhesive compositions of the present invention comprise at least one "epoxide group-containing compound". As used herein the term "epoxide group-containing compound" is the term used herein to make reference to fluid organic compounds containing an oxirane group that can be cured by use of a curing agent and/or a catalyst to a cured epoxy resin.

Epoxide group-containing compounds that can be used in the adhesive compositions of the invention are one or more mono- and polyglycidyl ethers or esters that are fluid at a temperature below 50° C., preferably below 30° C., selected from (1) mono- and polyglycidyl ethers of mono- and polyhydric alcohols and phenols, and (2) mono- and polyglycidyl esters of mono- and polycarboxylic acids. Included are monomeric and polymeric compounds that can have an epoxy equivalency of from 1 to 6, more typically 1 to 3. Examples of useful epoxide group-containing compounds are glycidyl propionate, diglycidyl adipate, diglycidyl ether of 1,1-dimethylol-3-cyclohexane, triglycidyl ether of glycerol, diglycidyl ether of 2,5-bis(hydroxymethyl)tetrahydrofuran, butyl glycidyl ether, phenyl glycidyl ether, diglycidyl ether of bisphenol A, the diglycidyl ether of resorcinol, the triglycidyl ether of phloroglucinol, the product of p-xylene dichloride and bisphenol A and others, as named in "Handbook of Epoxy Resins", McGraw-Hill, Inc., 1967. Especially preferred are the diglycidyl ethers of bisphenol A (e.g., the reaction products of epichlorohydrin and bisphenol A) having an epoxy equivalent weight of about 175 to 5,000 or more such as DER™-332 (diglycidyl ether of bisphenol A having an epoxy equivalent weight of 172 to 176, available from Dow Chemical Co.) and EPON™ 828 (diglycidyl ether of bisphenol A having an epoxy equivalent weight of 185 to 191, available from Shell Chemical Co.).

The adhesives of the invention are preferably provided to the end-user in two-part formulations with the individual parts (i.e., part A and part B) being housed in separate containers and mixed together prior to application of the adhesive to the substrate. In this way, the reactive materials are separated from one another until cure of the adhesive is desired. Depending upon the functionality of the oligomer it may be provided with part A or part B. For example, if the oligomer is amine-functional it may be provided with the amine curative in part A. If, however, the oligomer functionality is reactive with amines (e.g., isocyanate or epoxide functional) the oligomer may be provided with part B. Typically, with amine-functional oligomers, the adhesives are provided in two part formulations including a first part (i.e., part A) comprising the oligomer and the amine curative; and second part (i.e., part B) comprising the epoxide-group containing compound. Typically, part A comprises about 10% to 35% weight amine curing agent and about 60% to 85% by weight oligomer. In certain embodiments, part A comprises about 15% to 30% weight amine curing agent and about 65% to 80% by weight oligomer. Typically with isocyanate or epoxy functional oligomers, part B comprises 20% to 50% weight oligomer.

Optionally, part A may further comprise a tertiary amine, for example, 2,4,6-tris(dimethylaminomethyl)phenol which is commercially available under the trade designation "EH-30" from Aldrich Chemical Co. (Milwaukee, Wis.).

Optionally, part A or part B may further comprise one or more fillers, for example, glass beads, carbon black, metal powders, flame retardants, or fumed silica. A preferred fumed silica is that commercially available under the trade designation "CAB-O-SIL TS-720" from Cabot Corp. (Tuscola, Ill.). Other optional additives include silane coupling agents such as the epoxy silane available under the trade designation "Z-6040" commercially available from Dow Corning (Midland, Mich.).

For two-part adhesives, such as those of the invention, to be most easily used in commercial and industrial environments, the ratio at which the two parts are combined is typically a convenient whole number. This facilitates application of the adhesive with conventional, commercially available dispensers. Such dispensers are represented in U.S. Pat. Nos. 4,538,920 and 5,082,147 and are available from ConProTec, Inc. (Salem N.H.) under the tradename "MIX-PAC" and are sometimes described as dual syringe-type applicators. Typically, these dispensers use a pair of tubular receptacles arranged side-by-side with each tube being intended to receive one of the two parts of the adhesive. Two plungers, one for each tube, are simultaneously advanced (e.g., manually or by a hand-actuated ratcheting mechanism) to evacuate the contents of the tubes into a common, hollow, elongated mixing chamber that typically contains a static mixer to facilitate blending of the two parts. The blended adhesive is dispensed from the mixing chamber onto a substrate. Once the tubes have been emptied, they can be replaced with fresh tubes and the application process continued.

The ratio at which the two parts of adhesive are combined is typically controlled by the diameter of the tubes. (i.e., each plunger is sized to be received within a tube of fixed diameter, and the plungers are advanced into the tubes at the same speed.) A single dispenser is often intended for use with a variety of different two-part adhesives and the plungers are sized to deliver the two parts of the adhesive at a convenient mix ratio, for example, 4:1, 1:1, 1:2, 1:4 and 1:10.

Once the two parts have been combined, the adhesive should preferably be used within a short period of time. The adhesive is typically applied to one or both substrates and then the substrates are joined together with pressure to force excess adhesive out of the bond line. Full strength will normally be reached in less than 24 hours under ambient conditions. Post-curing at an elevated temperature may also be used if desired.

The invention will be more fully appreciated with reference to the following nonlimiting examples.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
|---|---|
| DP-460 | SCOTHWELD DP-460 adhesive commercially available from 3M Company, St. Paul, MN |
| E-20HP | adhesive commercially available from Loctite Corporation, Rocky Hill, CT |
| E-60HP | adhesive commercially available from Loctite Corporation, Rocky Hill, CT |
| DP-190 | SCOTHWELD DP-190 adhesive commercially available from 3M Company, St. Paul, MN |

-continued

Table of Abbreviations

| | |
|---|---|
| ATBN X-16 | Hycar Amine-Terminated Butadiene/Acrylonitrile Liquid Polymer commercially available from Noveon Specialty Chemicals, Cleveland, OH |
| EPON 828 | Bisphenol A based epoxy resin commercially available from Shell Chemical, Houston, TX |
| H221 | Diamine curing agent, 4,7,10-trioxa-1,13-tridecanediamine commercially available from Aldrich Chemical Company, Milwaukee, WI |
| Ultem | Glass/carbon black-filled Ultem plastic substrates from GE Plastics, Mt Vernon, IN |
| Cab-O-Sil TS-720 | Fumed silica commercially available from Cabot Corporation, Tuscola, IL |
| Z-6040 | Epoxy Silane commercially available from Dow Corning, Midland, MI |
| EH-30 | 2,4,6-Tris(dimethylaminomethyl)phenol commercially available from Aldrich Chemical Company, Milwaukee, WI |
| PBDE | Polybutadiene, epoxy/hydroxy functionalized, with an Epoxy Equivalent Weight (EEW) of 460, commercially available from Aldrich Chemical Company, Milwaukee, WI |
| DESMODUR W | Methylene bis(4-cyclohexyl isocyanate) commercially available from Bayer Corporation, Pittsburg, PA |
| ACCLAIM 4220N | Polyol commercially available from Bayer Corporation, Pittsburg, PA |
| PUP | polyurethane prepolymer was formed by reacting 2eq DESMODUR W with leq Acclaim 4220N in catalytic amount of dibutyltin diacetate |
| Glass Cubes | BK7 glasses available from Schott Glass Technologies, Duryea, PA. |
| Sheet Metal | Ni plated stainless metal from Oakdale Precision Inc, Oakdale, MN |

Test Methods

Shear Creep

The samples for shear creep tests were prepared by bonding two aluminum coupons in a 6 millimeter by 6 millimeter area. The tests were performed with a TA Instruments DMA 2980 Dynamic Mechanical Analyzer under 0.4 Newton force. The temperature profile was: 25° C. (30 min); 40° C. (30 min); 60° C. (30 min); −40° C. (30 min); 60° C. (30 min); −40° C. (30 min); 60° C. (30 min); −40° C. (30 min); 25° C. (30 min); 40° C. (30 min), the temperature was ramped up and down at a rate of 5° C./min. The test was to measure the adhesive dimension before and after three thermal cycles (−40° C. to 60° C.

Tensile Testing

The testing was carried out as described in test method ASTM D 1708-84. The samples for tensile tests were prepared by coating the uncured adhesives in 254 microns (10 mils) between two release liners and cured at 70° C. for 10 hours.

Thermal Shock Test

The thermal shock test was conducted by cycling the bonded assembly of Glass Cube with Ultem or Sheet Metal components from −40° C. (1 hour) to 60° C. (1 hour) in 10 cycles. The assembly is said to "Pass" the test if no spalling of the glass is observed and to "Fail" if such spalling occurs.

Glass Transition Temperature (Tg) Measurement

The glass transition temperature of the cured adhesives was determined on TA Instruments DSC Q1000. The DSC measurements were made in aluminum crimped pans under nitrogen with a heat rate of 10° C./min from −100° C. to 150° C.

Comparative Examples C1–C4

The commercially available adhesives DP-460, E-20HP, E-60HP, and DP-190 were used to prepare assemblies by bonding Glass Cubes to Ultem substrates or Sheet Metal and were cured at 70° C. for 10 hours. The assemblies were then tested for thermal shock according to the test method described above. Results are shown in Table C1. The adhesives were also tested for Shear Creep according to the test method described above. The results are shown in Table C2. Tensile Testing samples of the adhesive were also prepared and Tensile Testing was carried out as described in the Test Method above. The results are shown in Table C3.

TABLE C1

| Example | Adhesive | Thermal Shock Results Glass Cube to Ultem | Thermal Shock Results Glass Cube to Sheet Metal | Tg of Cured Adhesive (° C.) |
|---|---|---|---|---|
| C1 | DP-460 | Fail | Fail | 74 |
| C2 | E-20HP | Fail | Fail | 60 |
| C3 | E-60HP | Fail | Fail | 70 |
| C4 | DP-190 | Pass | Pass | 12 |

TABLE C2

| Example | Adhesive | Shear Creep (μm) |
|---|---|---|
| C1 | DP-460 | 5 |
| C2 | E-20HP | 4 |
| C3 | E-60HP | 9 |
| C4 | DP-190 | 50 |

TABLE C3

| Example | Adhesive | Yield Modulus (MPa) | Strain at Break (%) |
|---|---|---|---|
| C1 | DP-460 | 981 | 15 |
| C2 | E-20HP | 1218 | 8 |
| C3 | E-60HP | 1005 | 32 |
| C4 | DP-190 | 2.3 | 292 |

Examples 1–2 and Comparative Examples C5–C8

A series of 2 part adhesive formulations were prepared using the commercially available 2 part adhesive DP-460 as a base and modifying by adding ATBN X-16 to Part A and EPON 828 to Part B as is shown in Table 1. These formulations were used to prepare assemblies by bonding Glass Cubes to Ultem substrates or Sheet Metal and were cured at 70° C. for 10 hours. The assemblies were then tested for thermal shock according to the test method described above. Results are shown in Table 2. Glass transition temperatures (Tg) were determined for the cured adhesives as well as for the ATBN phase using the test method described above. Results are shown in Table 2. The adhesives were also tested for Shear Creep according to the test method described above. The results are shown in Table 3. Tensile Testing samples of the adhesive were also prepared and Tensile Testing was carried out as described in the Test Method above. The results are shown in Table 4.

TABLE 1

|         | ATBN X-16 Level | Part A          |                     | Part B          |                   |
|---------|-----------------|-----------------|---------------------|-----------------|-------------------|
| Example | (%)             | DP-460 Part A (gram) | ATBN X-16 (gram) | DP-460 Part B (gram) | EPON 828 (gram) |
| C5      | 15              | 9.60            | 5.64                | 20.00           | 2.36              |
| C6      | 20              | 9.60            | 8.26                | 20.00           | 3.45              |
| C7      | 25              | 9.60            | 11.46               | 20.00           | 4.79              |
| 1       | 30              | 9.60            | 15.45               | 20.00           | 6.46              |
| 2       | 40              | 9.60            | 27.36               | 20.00           | 11.42             |
| C8      | 50              | 9.60            | 50.84               | 20.00           | 21.24             |

TABLE 2

| Example | Thermal Shock Results Glass Cube to Ultem | Thermal Shock Results Glass Cube to Sheet Metal | Tg of Cured Adhesive (° C.) | Tg of ATBN X-16 Phase (° C.) |
|---------|-------------------------------------------|-------------------------------------------------|-----------------------------|------------------------------|
| C5      | Fail                                      | Fail                                            | 77                          | −49                          |
| C6      | Fail                                      | Fail                                            | 74                          | −48                          |
| C7      | Fail                                      | Fail                                            | 75                          | −50                          |
| 1       | Fail                                      | Pass                                            | 78                          | −48                          |
| 2       | Pass                                      | Pass                                            | 84                          | −49                          |
| C8      | Pass                                      | Pass                                            | 89                          | −48                          |

TABLE 3

| Example | ATBN X-16 Level (%) | Shear Creep (μm) |
|---------|---------------------|------------------|
| C5      | 15                  | 4                |
| C6      | 20                  | 4                |
| C7      | 25                  | 5                |
| 1       | 30                  | 7                |
| 2       | 40                  | 10               |
| C8      | 50                  | 21               |

TABLE 4

| Example | ATBN X-16 Level (%) | Yield Modulus (MPa) | Strain at Break (%) |
|---------|---------------------|---------------------|---------------------|
| C5      | 15                  | 758                 | 15                  |
| C6      | 20                  | 646                 | 18                  |
| C7      | 25                  | 431                 | 27                  |
| 1       | 30                  | 191                 | 30                  |
| 2       | 40                  | 142                 | 36                  |
| C8      | 50                  | 7.3                 | 98                  |

Examples 3–5 and Comparative Example C9–C10

Two part adhesive formulations were prepared using the reagents shown in Table 5. These formulations were used to prepare assemblies by bonding Glass Cubes to Ultem substrates or Sheet Metal and were cured at 70° C. for 10 hours. The assemblies were then tested for thermal shock according to the test method described above. Results are shown in Table 6. Glass transition temperatures (Tg) were determined for the cured adhesives as well as for the ATBN phase using the test method described above. Results are shown in Table 6. The adhesives were also tested for Shear Creep according to the test method described above. The results are shown in Table 7. Tensile Testing samples of the adhesive were also prepared and Tensile Testing was carried out as described in the Test Method above. The results are shown in Table 8.

TABLE 5

| Example | ATBN X-16 Level (%) | Part A       |              |                  |                       | Part B          |                 |
|---------|---------------------|--------------|--------------|------------------|-----------------------|-----------------|-----------------|
|         |                     | H221 (gram)  | EH-30 (gram) | ATBN X-16 (gram) | Cab-O-Sil TS-720 (gram) | EPON 828 (gram) | Z-6040 (gram)   |
| C9      | 25                  | 13.97        | 1.20         | 25.00            | 1.60                  | 57.83           | 0.40            |
| 3       | 30                  | 12.37        | 1.20         | 30.00            | 1.60                  | 54.43           | 0.40            |
| 4       | 35                  | 10.76        | 1.20         | 35.00            | 1.60                  | 51.04           | 0.40            |
| 5       | 40                  | 9.16         | 1.20         | 40.00            | 1.60                  | 47.64           | 0.40            |
| C10     | 50                  | 5.94         | 1.20         | 50.00            | 1.60                  | 40.86           | 0.40            |

TABLE 6

| Example | Thermal Shock Results Glass Cube to Ultem | Thermal Shock Results Glass Cube to Sheet Metal | Tg of Cured Adhesive (° C.) | Tg of ATBN X-16 Phase (° C.) |
|---------|-------------------------------------------|-------------------------------------------------|-----------------------------|------------------------------|
| C9      | Fail                                      | Fail                                            | 79                          | −50                          |
| 3       | Fail                                      | Pass                                            | 82                          | −48                          |
| 4       | Pass                                      | Pass                                            | 80                          | −50                          |
| 5       | Pass                                      | Pass                                            | 82                          | −49                          |
| C10     | Pass                                      | Pass                                            | 84                          | −49                          |

TABLE 7

| Example | ATBN X-16 Level (%) | Shear Creep (μm) |
|---------|---------------------|------------------|
| C9      | 25                  | 2                |
| 3       | 30                  | 2                |
| 4       | 35                  | 5                |
| 5       | 40                  | 6                |
| C10     | 50                  | 17               |

TABLE 8

| Example | ATBN X-16 Level (%) | Yield Modulus (MPa) | Strain at Break (%) |
|---------|---------------------|---------------------|---------------------|
| C9      | 25                  | 672                 | 21                  |
| 3       | 30                  | 340                 | 30                  |
| 4       | 35                  | 218                 | 41                  |
| 5       | 40                  | 34                  | 55                  |
| C10     | 50                  | 22                  | 72                  |

Adhesives that pass the Thermal Shock Test and have a Shear Creep of about 10 microns or less typically have a yield modulus in the range of from about 30 to 350 MPa and a strain at break from about 30% to 70%.

Examples 6–9 and Comparative Example C11

Two part adhesive formulations were prepared using the reagents shown in Table 9. These formulations were used to prepare assemblies by bonding Glass Cubes to Ultem substrates or Sheet Metal and were cured at 70° C. for 10 hours. The assemblies were then tested for thermal shock according to the test method described above. Results are shown in Table 10. Glass transition temperatures (Tg) were determined for the cured adhesives as well as for the PBDE phase using the test method described above. Results are shown in Table 10. The adhesives were also tested for Shear Creep according to the test method described above. The results are shown in Table 11.

TABLE 9

| | | Part A | | Part B | | |
|---|---|---|---|---|---|---|
| Example | PBDE Level (%) | EH-30 (gram) | H221 (gram) | PBDE (gram) | EPON 828 (gram) | Z-6040 (gram) | Cab-O-sil TS-720 (gram) |
| 6 | 20 | 0.60 | 9.71 | 10.00 | 28.69 | 0.20 | 0.80 |
| 7 | 25 | 0.60 | 9.37 | 12.50 | 26.53 | 0.20 | 0.80 |
| 8 | 30 | 0.60 | 9.04 | 15.00 | 24.36 | 0.20 | 0.80 |
| 9 | 35 | 0.60 | 8.70 | 17.50 | 22.20 | 0.20 | 0.80 |
| C11 | 40 | 0.60 | 8.37 | 20.00 | 20.03 | 0.20 | 0.80 |

TABLE 10

| Example | Thermal Shock Results Glass Cube to Ultem | Thermal Shock Results Glass Cube to Sheet Metal | Tg of Cured Adhesive (° C.) | Tg of PBDE Phase (° C.) |
|---|---|---|---|---|
| 6 | Fail | Pass | 48 | −65 |
| 7 | Pass | Pass | 46 | −63 |
| 8 | Pass | Pass | 41 | −66 |
| 9 | Pass | Pass | 38 | −61 |
| C11 | Pass | Pass | 34 | −64 |

TABLE 11

| Example | PBDE Level (%) | Shear Creep (μm) |
|---|---|---|
| 6 | 20 | 2 |
| 7 | 25 | 1 |
| 8 | 30 | 2 |
| 9 | 35 | 8 |
| C11 | 40 | 15 |

Example 10 and Comparative Examples C12–C13

Two part adhesive formulations were prepared using the reagents shown in Table 12. These formulations were used to prepare assemblies by bonding Glass Cubes to Ultem substrates or Sheet Metal and were cured at 70° C. for 10 hours. The assemblies were then tested for thermal shock according to the test method described above. Results are shown in Table 13. Glass transition temperatures (Tg) were determined for the cured adhesives as well as for the PUP phase using the test method described above. Results are shown in Table 13. The adhesives were also tested for Shear Creep according to the test method described above. The results are shown in Table 14.

TABLE 12

| | | Part A | | Part B | | |
|---|---|---|---|---|---|---|
| Example | PUP Level (%) | EH-30 (gram) | H221 (gram) | PUP (gram) | EPON 828 (gram) | Z-6040 (gram) | Cab-O-sil TS-720 (gram) |
| C12 | 20 | 0.24 | 3.65 | 8.00 | 28.69 | 0.08 | 032 |
| 10 | 30 | 0.24 | 3.27 | 12.00 | 26.53 | 0.08 | 0.32 |
| C13 | 40 | 0.24 | 2.90 | 16.00 | 24.36 | 0.08 | 0.32 |

TABLE 13

| Example | Thermal Shock Results Glass Cube to Ultem | Thermal Shock Results Glass Cube to Sheet Metal | Tg of Cured Adhesive (° C.) | Tg of PUP Phase (° C.) |
|---|---|---|---|---|
| C12 | Fail | Fail | 64 | −50 |
| 10 | Pass | Pass | 67 | −48 |
| C13 | Pass | Pass | 68 | −48 |

TABLE 14

| Example | PUP Level (%) | Shear Creep (μm) |
|---|---|---|
| C12 | 20 | 4 |
| 10 | 30 | 3 |
| C13 | 40 | 11 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An epoxy adhesive comprising:
   about 30% to about 40% weight, based upon the total weight of the epoxy adhesive, of a reactive oligomer having a glass transition temperature of about −40° C. or less after curing and having at least two functional groups selected from the group consisting of epoxide, isocyanate, and amine; and wherein the oligomer has a molecular weight range from about 500 to about 20,000 when the oligomer is epoxy-terminated;
   an amine curative; and
   an epoxide-group containing compound;
   wherein the epoxy adhesive when cured passes the Thermal Shock Test and has a Shear Creep of about 10 microns or less.

2. The epoxy adhesive of claim 1, wherein the oligomer is epoxy-terminated.

3. The epoxy adhesive of claim 1, wherein the oligomer is isocyanate-terminated.

4. The epoxy adhesive of claim 1, wherein the oligomer is amine-terminated.

5. The epoxy adhesive of claim 1, wherein the oligomer is an amine-terminated butadiene/acrylonitrile.

6. The epoxy adhesive of claim 1, wherein the amine curative is a diamine.

7. The epoxy adhesive of claim 6, wherein the diamine is 4,7,10-trioxa-tridecanediamine.

8. The epoxy adhesive of claim 6, wherein the amine curative is a poly(oxyhydrocarbolene)diamine having the formula:

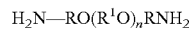

$H_2N-RO(R^1O)_nRNH_2$ where: R is a linear or branched chain alkylene group having 2 to 4 carbon atoms;

R¹ is an hydrocarbolene group having 2 to 8 carbon atoms selected from the group consisting of straight and branched chain alkylene groups having 2 to 4 carbon atoms, cycloalkylene groups having 4 to 8 carbons, and arene groups having 6 to carbon atoms, and n is a number having a value of 1 to 10 such that the number average molecular weight of said curing agent is from 17 to 750; with the proviso that when R¹ is a branched chain alkylene the value of n is at least 5.

9. The epoxy adhesive of claim 6, wherein the amine curative is a poly(oxyhydrocarbolene)diamine curing agent having the formula:

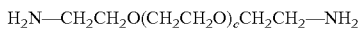

where c is 4 to 10.

10. The epoxy adhesive of claim 6, wherein the amine curative is a poly(oxyhydrocarbolene)diamine curing agent having the formula:

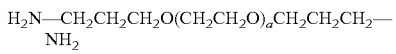

where a is 1 to 5.

11. The epoxy adhesive of claim 1, wherein the epoxide-group containing compound is selected from the group consisting of mono- and polyglycidyl ethers of mono- and polyhydric alcohols and phenols, and mono- and polyglycidyl esters of mono- and polycarboxylic acids.

12. The epoxy adhesive of claim 1, wherein the epoxide-group containing compound is glycidyl propionate, diglycidyl adipate, diglycidyl ether of 1,1-dimethylol-3-cyclohexane, triglycidyl ether of glycerol, diglycidyl ether of 2,5-bis(hydroxymethyl)tetrahydrofuran, butyl glycidyl ether, phenyl glycidyl ether, diglycidyl ether of bisphenol A, diglycidyl ether of resorcinol, triglycidyl ether of phloroglucinol, or the reaction product of p-xylene dichloride and bisphenol A.

13. The epoxy adhesive of claim 1, wherein the epoxy adhesive has a Shear Creep of about 10 microns or less.

14. A two part epoxy adhesive comprising:
(i) a first part comprising:
about 60% to 85% by weight, based upon the total weight of the epoxy adhesive, of a reactive oligomer having a glass transition temperature of about −40° C. or less after curing and having at least two amine functional groups; and
about 10% to 35% weight, based upon the total weight of the epoxy adhesive, of an amine curative; and
(ii) a second part comprising:
an epoxide-group containing compound;
wherein the epoxy adhesive when cured passes the Thermal Shock Test and has a Shear Creep of about 10 microns or less.

15. A two part epoxy adhesive comprising:
(i) a first part comprising an amine curative;
(ii) a second part comprising:
about 30% to 50% by weight, based upon the total weight of the epoxy adhesive, of a reactive oligomer having a glass transition temperature of about −40° C. or less after curing and having at least two functional groups selected from the group consisting of epoxide and isocyanate, wherein the reactive oligomer has a molecular weight range from about 500 to about 20,000 when the oligomer is epoxy-terminated; and
an epoxide-group containing compound;
wherein the epoxy adhesive when cured passes the Thermal Shock Test and has a Shear Creep of about 10 microns or less.

* * * * *

UNITED STATES PATENT AND TRADEMARK OFFICE
CERTIFICATE OF CORRECTION

PATENT NO. : 7,071,263 B2 Page 1 of 1
APPLICATION NO. : 10/440591
DATED : July 4, 2006
INVENTOR(S) : Ming Cheng It is certified that error appears in the above-identified patent and that said Letters Patent is hereby corrected as shown below:

Column 11,
Table 12, Line 63, delete "032" and insert in place thereof -- 0.32 --.

Signed and Sealed this

Twentieth Day of May, 2008

JON W. DUDAS
*Director of the United States Patent and Trademark Office*